United States Patent
Liang

(10) Patent No.: US 8,201,834 B1
(45) Date of Patent: Jun. 19, 2012

(54) TURBINE VANE MATE FACE SEAL ASSEMBLY

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 320 days.

(21) Appl. No.: 12/766,978

(22) Filed: Apr. 26, 2010

(51) Int. Cl.
*F16J 15/02* (2006.01)
*F01D 25/26* (2006.01)

(52) U.S. Cl. .................................................. 277/637

(58) Field of Classification Search .................. 277/637, 277/642–644; 415/138, 139, 170.1, 173.5, 415/174.5

See application file for complete search history.

(56) References Cited

U.S. PATENT DOCUMENTS

| 5,088,888 | A  | * | 2/1992  | Bobo            | 415/170.1 |
|-----------|----|---|---------|-----------------|-----------|
| 6,079,944 | A  | * | 6/2000  | Tomita et al.   | 415/139   |
| 6,162,014 | A  | * | 12/2000 | Bagepalli et al.| 415/170.1 |
| 6,340,285 | B1 | * | 1/2002  | Gonyou et al.   | 415/116   |
| 6,971,844 | B2 | * | 12/2005 | Burdgick        | 415/139   |
| 7,097,423 | B2 | * | 8/2006  | Burdgick        | 415/173.7 |
| 7,938,621 | B1 | * | 5/2011  | Balsdon et al.  | 415/173.1 |

* cited by examiner

*Primary Examiner* — Vishal Patel
(74) *Attorney, Agent, or Firm* — John Ryznic

(57) ABSTRACT

A stator vane with a mate-face cooling and sealing arrangement, the vane end rails include an upper axial seal slot and a lower axial seal slot with an upper riffle seal and a lower riffle seal secured within the two axial seal slots. The vane end rails also include a number of vertical seal slots spaced along the axial direction to receive a number of vertical riffle seals. The vertical riffle seals have an upper slot and a lower slot that allow for the two axial riffle seals to extend through and form a series of diffusion compartments along the seal assembly and mate faces.

4 Claims, 6 Drawing Sheets

TURBINE VANE MATE FACE SEAL ASSEMBLY

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a gas turbine engine, and more specifically to a stator vane with a mate face seal.

2. Description of the Related Art Including Information Disclosed Under 37 CFR 1.97 and 1.98

A gas turbine engine, such as a large frame heavy duty industrial gas turbine (IGT) engine, includes a turbine with one or more stages of stator vanes to guide a hot gas flow toward a downstream row of rotor blades. Stator vanes are typically made in segments with one or more airfoils extending between an outer shroud and an inner shroud. Because the turbine operates under a high temperature, thermal expansion of the stator vane segments requires a loose fit at the engine cold state so that any gaps are closed when the parts are at the high operating temperature.

FIG. 1 shows two stator vane segments each with a single airfoil 11 with a prior art vane mate-face cooling and sealing arrangement. The airfoil extends between endwalls 12 or shrouds and is attached to the engine through aft hooks 13. In the FIG. 1 vane mate-face design, there is no built-in scheme or any sealing arrangement to prevent hot gas ingression along an axial gap at a junction between two adjacent vane rails 14 as well as misalignment between two abutting vane end rails. FIG. 2 shows a detailed cross section view of the vane mate-face seal design for two adjacent mate-faces. Each mate-face includes a slot 15 in which a feather seal 16 is placed to seal a gap 17 between the two mate-faces. Impingement cavities 18 are formed on the top surface to provide impingement cooling for the endwalls. Metering holes 19 deliver cooling air form the impingement cavities 18 to the gap 17 to cool the mate-face and to purge hot gas flow from passing into the gap 17. A TBC (thermal barrier coating) 20 is applied on the hot gas side of the endwalls. FIG. 2 shows a riffle seal 24 used to seal the mate face gap in a prior art turbine stator vane like FIG. 1.

As a result of the FIG. 1 structure, hot gas flows in and out along the mate-face gaps and creates an over-temperature at the vane rails corresponding to the hot gas injection location. In addition, use of a feather seal for the sealing mate-face gap will not provide for a good seal or alignment of the vanes.

BRIEF SUMMARY OF THE INVENTION

A mate-face cooling and sealing arrangement for stator vanes in which the mate-face of each vane includes a double riffle seals that both extend in an axial direction in the vane end rails and a number of vertical arranged flow blocker riffle seals spaced along the mate faces. The vertical seals have two openings in which the axial riffle seals extend through and create a number of axial spaced compartments within the mate faces of the vane rails that function as cooling air flow diffusion slots to improve the mate face cooling.

DETAILED DESCRIPTION OF THE INVENTION

Figure 1:
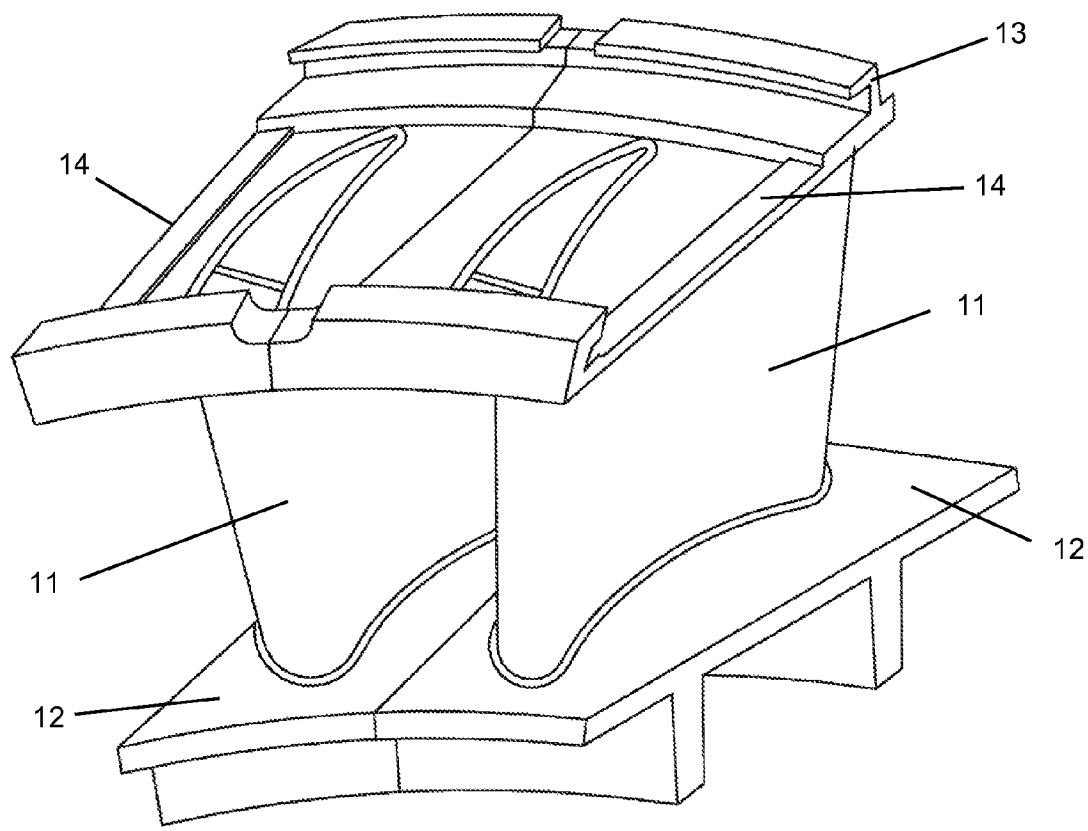
FIG. 1 shows a schematic view of two stator vanes with a mate-face cooling and sealing arrangement of the prior art.
Figure 2:
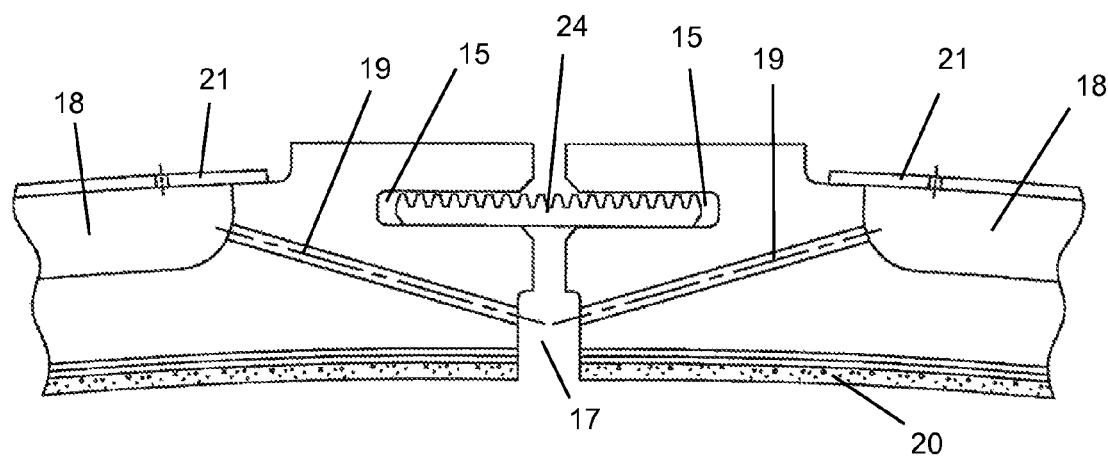
FIG. 2 shows a detailed cross section view of the mate-face sealing and cooling design of FIG. 1 along an axial gap direction.
Figure 3:
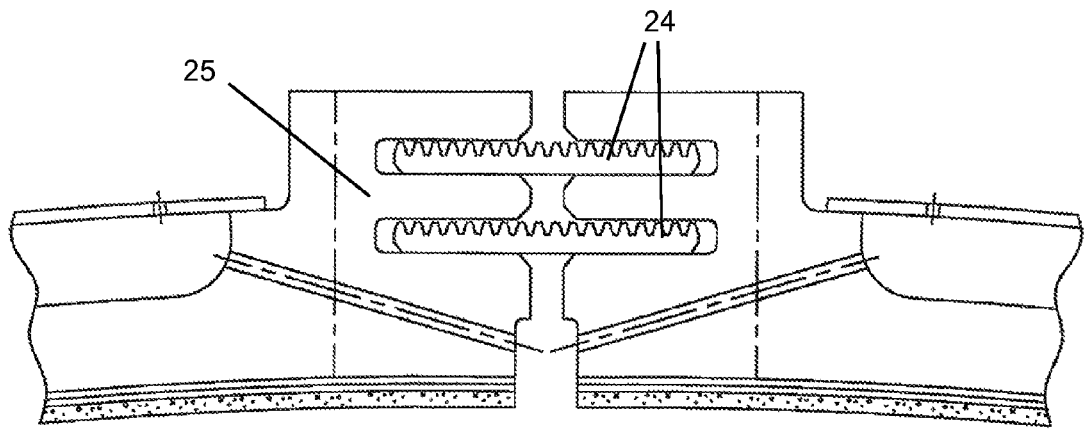
FIG. 3 shows a cross section view along the mate face gap of the double riffle seal and vertical flow blocker seal arrangement of the present invention.

A turbine stator vane with a mate-face sealing and cooling design of the present invention is intended for use in a large framed heavy duty industrial gas turbine engine, but could also be used in other types of gas turbine engines that require seals between adjacent mate faces with a gap. FIG. 2 shows a prior art riffle seal 24 secured within slots 15 formed on the mate faces of adjacent vane rails. The vane of the present invention includes a larger mate face section as seen in FIG. 3 for placing two riffle seals 24 within two separate slots 15 in the mate faces. The riffle seals 24 have a smooth bottom side and a top side with teeth that tightly grip the slot surface to limit twisting or shifting of one slot with respect to the opposite slot 15. The two riffle seals 24 shown in FIG. 3 are considered to be axial seals since they extend along the axial direction of the mate face gap.

Figure 4:
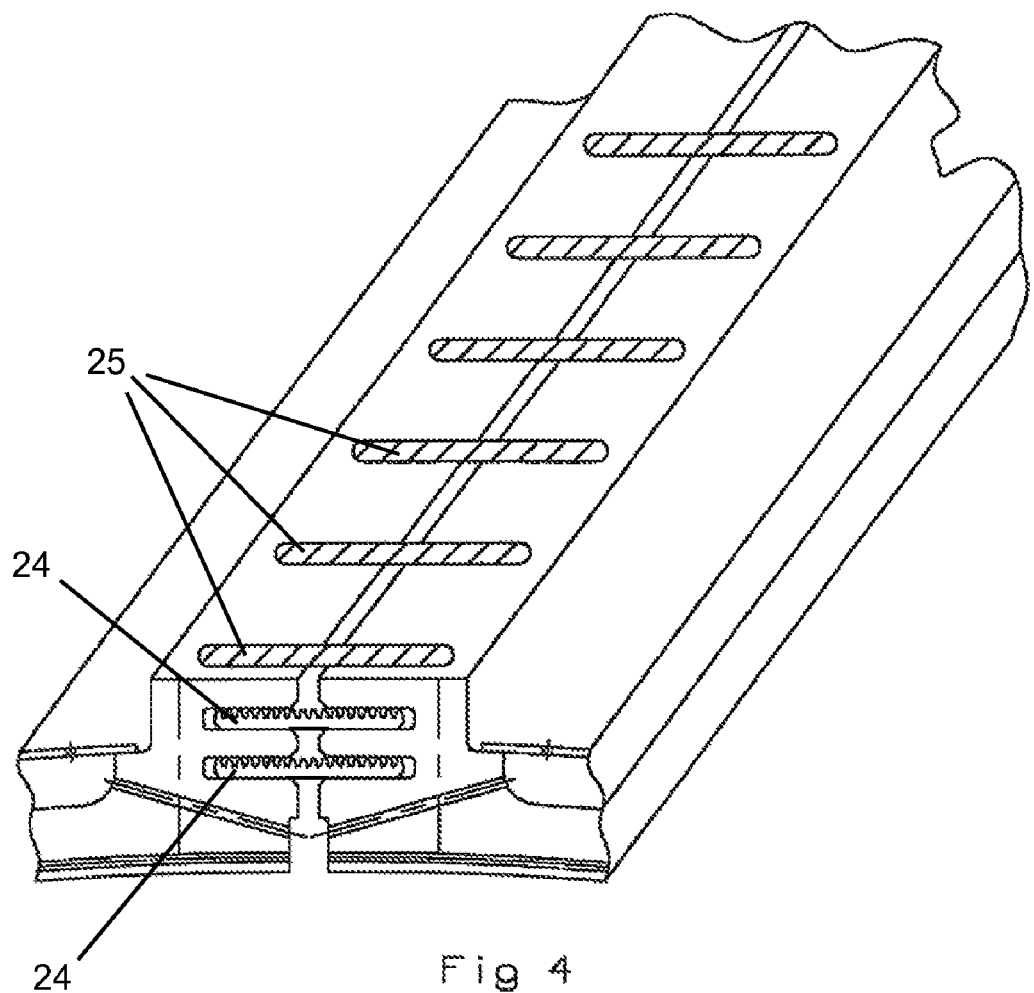
FIG. 4 shows a schematic view of the mate face gap with the seals of the present invention.
Figure 5:
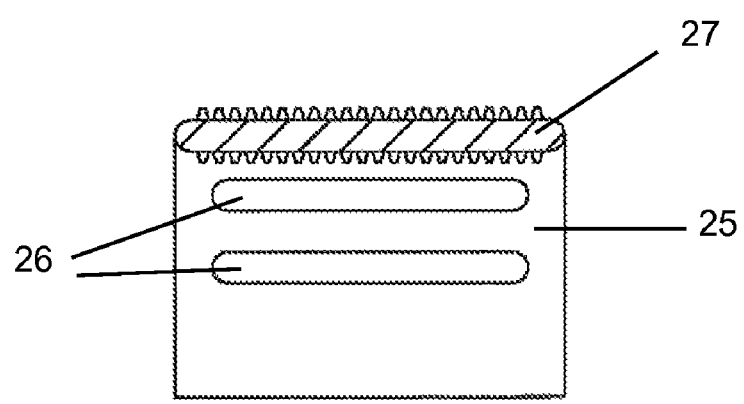
FIG. 5 shows a front view of the vertical flow blocker riffle seal of the present invention.

FIG. 4 shows another feature of the mate face seal arrangement of the present invention which includes a number of vertical seals 25 that are spaced along the axial direction of the mate face gap. FIG. 5 shows one of these vertical seals 25 which includes two slots 26 to receive the two axial riffle seals 24 and teeth 27 on the top end that form a riffle seal. Thus, the vertical seal becomes a vertical extending riffle seal 25. The vertical riffle seals 25 are secured within individual vertical slots also formed within the mate faces of the vane rails and intersect with the axial slots for the axial riffle seals 24. FIGS. 3 and 4 both show dashed lines that represent the location of the vertical riffle seal 25 in the mate faces.

The seals of the present invention are pre-assembled with the axial riffle seals 24 placed within the slots 26 of the vertical riffle seals 25 with the proper spacing so that the entire seal assembly can be inserted into the axial slots and vertical slots formed within the two adjacent mate faces. When the axial seals 24 are inserted into the slots of the vertical seals 25 and the seal assembly is placed within the mate face slots, the seal assembly formed a series of axial spaced compartments within the mate faces of the vane rail and function as cooling air flow diffusion slots to improve the mate face cooling. Also, this series of local compartments will function as a flow blocker for the mate face gap to minimize the hot gas flow ingestion in to or out from the mate face gap and prevent an over-temperature of the mate face. The horizontal riffle seal with teeth on the top side will provide for a tight fit into the vertical slots and thus minimize any misalignment between two adjacent ring segments during engine operation as well as to secure the vertical seals in place.

Figure 6:
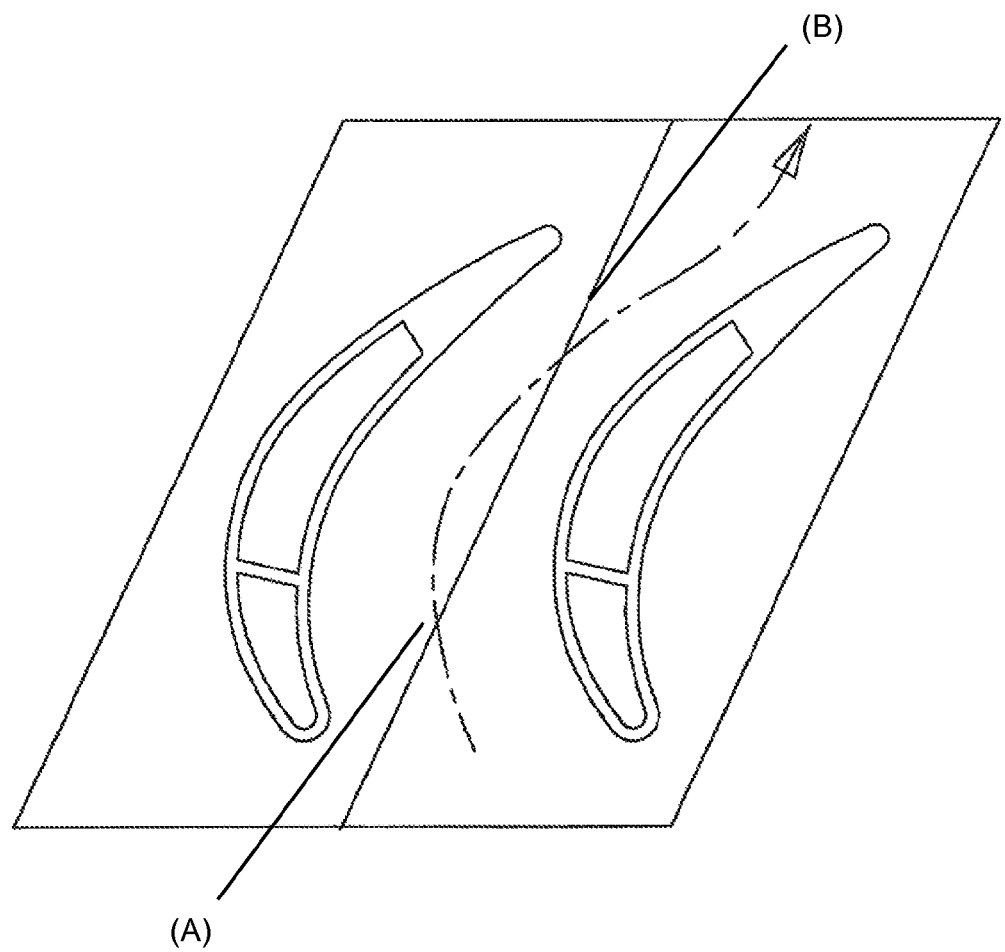
FIG. 6 shows a top view of two adjacent stator vanes with endwalls with the streamwise hot gas path represented by an arrow.
Figure 7:
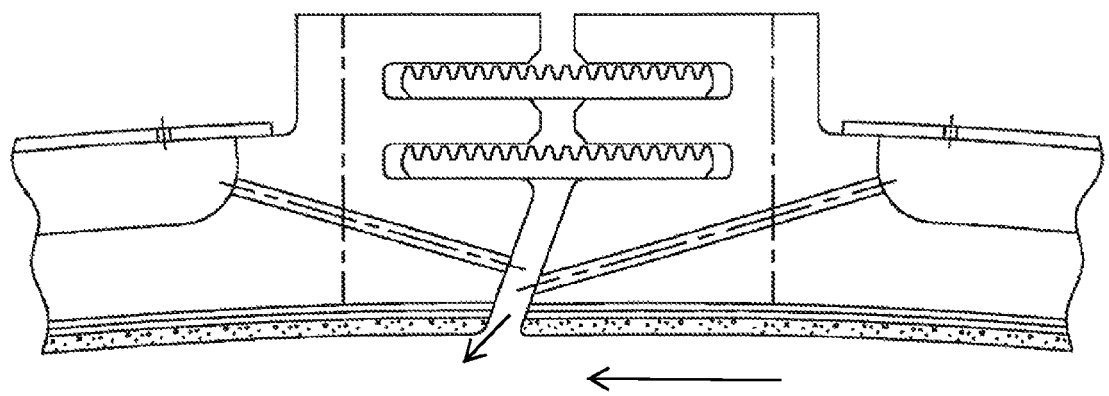
FIG. 7 shows a cross section view of the seals and rail cooling holes at a location (A) shown in FIG. 6.
Figure 8:
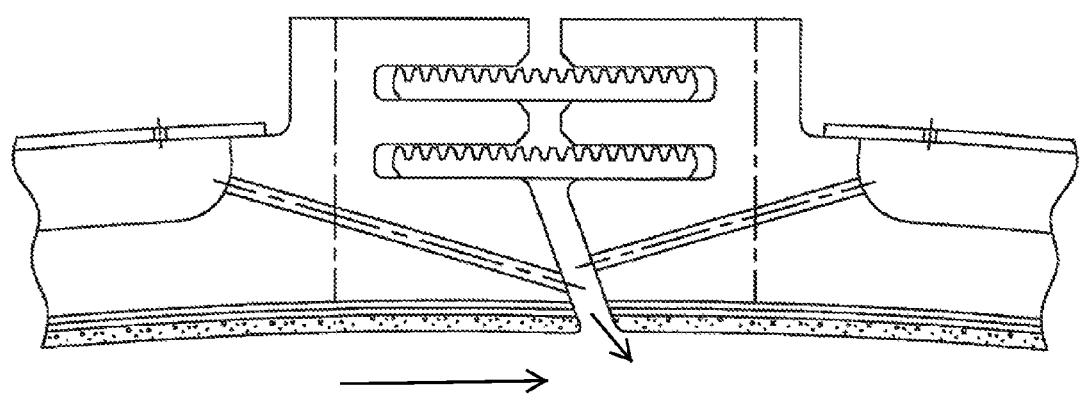
FIG. 8 shows a cross section view of the seals and rail cooling holes at a location (B) shown in FIG. 6.

FIG. 6 shows a top view of the vanes and endwalls with the mate faces formed between adjacent airfoils. The arrow represents the streamwise flow of the hot gas through the vane. FIG. 7 shows a cross section view of the mate face and seal assembly at the location (A) shown in FIG. 6, while FIG. 8 shows a cross section view of the mate face and seal assembly at the location (B). FIG. 8 is a view looking along the axial direction of the mate face but opposite to that of FIG. 7. The streamwise flow direction is opposite to that in FIG. 7. The cooling air exiting from the mate face gap is shown by the smaller arrow.

In operation, cooling air that impinges onto the backside of the vane outer diameter (OD) endwall is passed through the rail cooling holes 19 for cooling of the rails. The cooling air from the rail cooling holes 19 is discharged into the diffusion compartments formed by the riffle seal assembly and the vane mate face. The cooling air is then discharged into the hot gas path to provide film cooling for the vane rail edge. this prevents the hot gas ingression into the mate face. The metering and diffusion of the cooling air within the compartments of the riffle seal assembly and the discharge of the cooling air as film cooling in the streamwise direction provides for a very effective cooling arrangement for the vane mate face cooling and sealing.

I claim the following:

1. A stator vane mate face cooling and sealing assembly comprising:
    a first vane endwall with a first vane end rail;
    a second vane endwall with a second vane end rail;
    an upper slot in the first and second vane end rails;
    a lower seal slot in the first and second end rails;
    a first seal secured within the upper slots;
    a second seal secured within the lower slots;
    a plurality of vertical seals secured within a plurality of vertical slots formed within the first and second vane end rails; and,
    the plurality of vertical seals each having an upper slot and a lower slot in which the first and second seals extend through to form a series of compartments along the mate faces.

2. The stator vane mate face cooling and sealing assembly of claim 1, and further comprising:
    the first seal and the second seal are both riffle seals having a smooth bottom side and a toothed top side.

3. The stator vane mate face cooling and sealing assembly of claim 1, and further comprising:
    the vertical seal is a riffle seal with a smooth bottom side and a toothed top side.

4. The stator vane mate face cooling and sealing assembly of claim 1, and further comprising:
    the vertical seals have a width greater than a width of the axial seals in an axial direction of the mate face gap.

\* \* \* \* \*